Nov. 30, 1943.　　　　C. A. HALL　　　　2,335,757
STORAGE BATTERY RETAINER
Filed Oct. 13, 1939
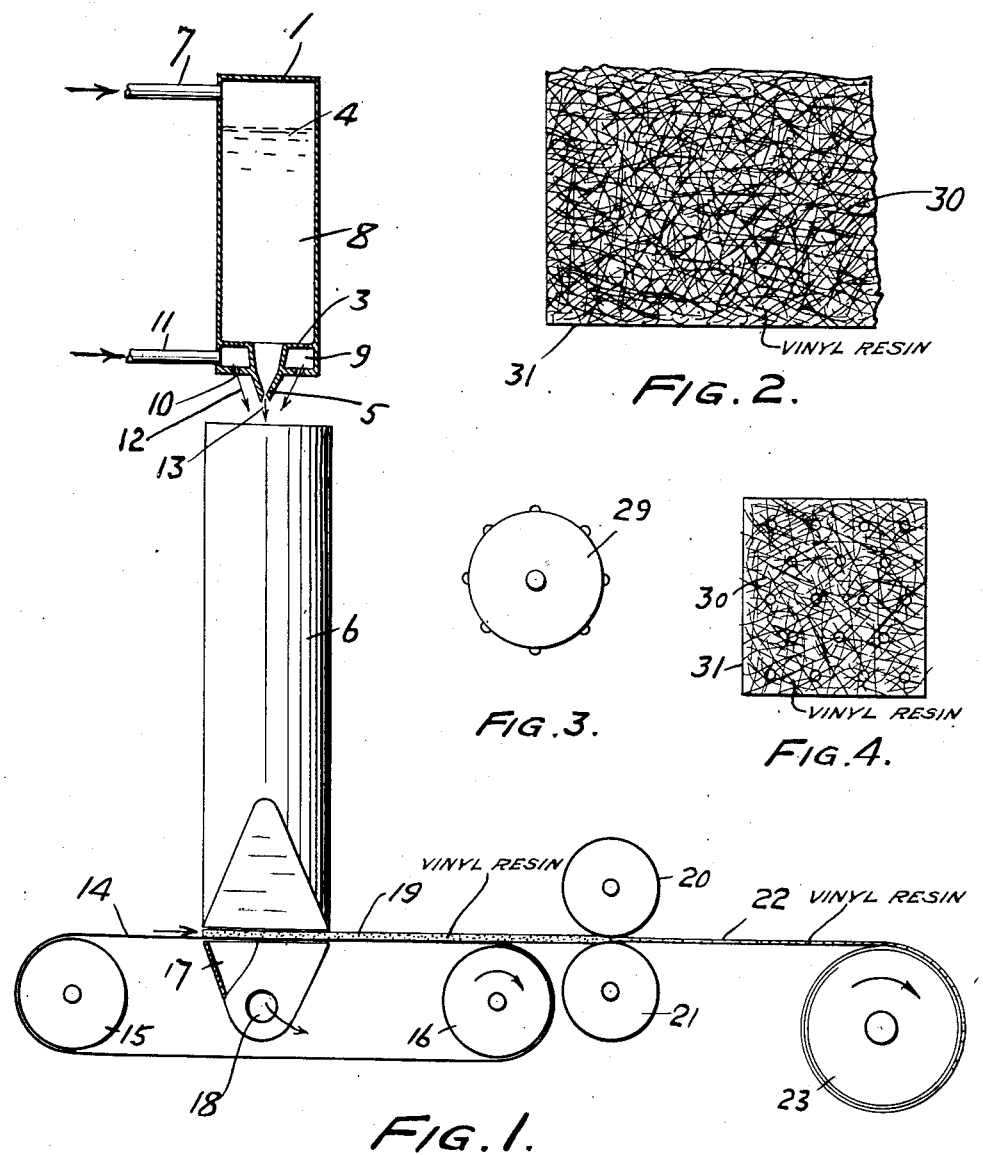
WITNESS:
Rob't N. Mitchell
INVENTOR
Clarence A. Hall
BY
Augustus B Stoughton
ATTORNEY.

Patented Nov. 30, 1943

2,335,757

UNITED STATES PATENT OFFICE 2,335,757

STORAGE BATTERY RETAINER

Clarence A. Hall, Philadelphia, Pa., assignor to The Electric Storage Battery Company, Philadelphia, Pa., a corporation of New Jersey Application October 13, 1939, Serial No. 299,285

5 Claims. (Cl. 136—146)

The object of my invention is to provide a storage battery retainer comprising a felted body of fine, heterogeneously disposed filaments of vinyl resin attached to each other at their intersections. Otherwise stated, my invention comprises a body made up of a mesh or net of intermeshed, intersecting filaments all of the same substance; i. e., vinyl resin, and solid or homogeneous at their branches or junctions.

The function of a retainer in a storage battery is largely to retain the active material of the positive plate to prevent it from coming into contact with the wood separator or from falling to the bottom of the cell.

The advantages of vinyl resin are: that the contiguous filaments can be made to attach to each other by the application of light pressure and a comparatively low temperature, thus producing a unitary structure which is self-supporting and can be handled for the purpose of assembly without introducing brittleness. This result is obtained without the use of an adhesive. Brittleness is avoided because the filaments of vinyl resin are remarkably flexible and thus provide sufficient flexibility between closely spaced points of attachment to permit the filaments to bend or give without breaking at their points of attachment.

Another advantage of vinyl resin is that the threads or filaments in a state of molecular saturation are resistant to and resilient in the powerful oxidizing environment prevailing at the surface of the plates of a storage battery, particularly the positive plate.

Another feature of my invention is that the retainer may be made with a smooth edge formed by causing the filaments at the edge to adhere to each other and preventing them from loosening and projecting beyond the margins of the retainers in service where they may catch any active material dislodged from the plates and cause short-circuits between the edges of plates of opposite polarity.

Another object of my invention is to provide a novel process of making such storage battery retainers. This process consists in forming a jet of a solution of vinyl resin, converging jets of compressed air on the jet of vinyl resin solution, thereby breaking up the liquid into very fine filaments and causing the solvent to evaporate, conducting the filaments by gravity or otherwise for a sufficient distance to cause them to become solid threads, receiving the solid threads into a heterogeneously disposed mat on a traveling conveyor, and subjecting the mat to the application of light pressure and a comparatively low heat, thereby causing the contiguous filaments to adhere to each other.

A further process of my invention consists in trimming the mat formed as above described by means of heated shearing apparatus, thus causing the filaments at the edges to adhere to each other to form a smooth edge and to prevent them from loosening and projecting from the margins of the retainers in service.

For a further exposition of my invention, reference may be had to the annexed drawing and specification at the end whereof my invention will be specifically pointed out and claimed.

In the drawing:

Fig. 1 is a diagrammatic view, principally in side elevation with parts in vertical cross-section, of a suitable apparatus for carrying out my invention.

Fig. 2 is a diagrammatic face or plan view of a portion of a retainer of my invention.

Fig. 3 is a diagrammatic view in side elevation of a modified form of roll.

Fig. 4 is a diagrammatic face or plan view, on a reduced scale, of a modified form of retainer.

Vinyl resins are a well known class of synthetic resins which may be defined as solid thermoplastic saturated synthetic resins resulting from the polymerization of compounds of the vinyl group, $CH_2=CH$. Examples of vinyl resins are "Vinylite" and "Lucite" and "Polystyrene."

Referring to Fig. 1, 1 is a container which may be cylindrical and is divided by a partition 3 into upper and lower chambers 8 and 9, respectively. The upper chamber contains a solution of the vinyl resin indicated at 4 and terminates below in a nozzle 5, from which the solution is ejected in a fine stream into the top of the cylindrical chute 6. The upper chamber 8 is provided near the top with a pipe 7 through which compressed air may be supplied to force the solution out through the nozzle 5. The base of the lower chamber 9 is perforated with a series of holes or ducts 10 arranged in a circle around the nozzle 5 and directed at a slight angle from the vertical. A pipe 11 is provided at one side of the chamber 9 through which compressed air may be supplied, whereby jets of compressed air 12 are forced through the openings 10 and converge on the jet of liquid 13 coming out of the orifice 5. These jets of compressed air break up the stream of liquid into very fine filaments and cause the solvent to evaporate so that, by the time these filaments reach the bottom of the chute 6, they have become solid threads. The chute 6, which may be cylindrical above, is provided with a rectangular orifice at the bottom confronting the traveling conveyor 14 of fine wire mesh which is caused to travel in the direction of the arrow around the drums 15 and 16 by means of any suitable mechanism (not shown). Beneath the traveling conveyor 14 and immediately confronting the lower opening of the chute 6 is an exhaust chamber 17 provided with an exhaust pipe 18, by means of which the entrained filaments of vinyl resin in the chute 6 are caused to loosely pack into a mat 19 on the conveyor 14 which, after leaving the conveyor, is carried between the two heated rolls 20 and 21, whereby pressure and elevated temperature are applied to the mat, compacting this into a coherent and self-supporting strip 22, which may be rolled on the drum 23 and thereafter cut into suitable sizes for storage battery retainers and the like.

As an example of the solution introduced into the container 1, a 15% solution of "Lucite" in toluene plus 10% methyl alcohol has been found satisfactory. A pressure of about one pound per square inch is applied through the pipe 7 to the upper surface of the solution, and compressed air under a pressure of seventy-five pounds per square inch is introduced through the pipe 11 into the chamber 9. The orifice 5 may have a diameter at its exit of 0.01 inch and the openings 10 may have a diameter of 0.04 inch and be directed at an angle of about 5° from the vertical. For the conveyor 14 a sixty mesh screen has been found satisfactory. The rolls 20 and 21 are heated to a temperature of about 250° F. It will be understood, of course, that these dimensions and other details may be varied to obtain the particular results and characteristics of the product that may be desired.

Fig. 2 shows a portion of the retainer 30 having a smooth edge 31.

Instead of applying a uniform pressure over the entire surface of the mat, this pressure may be applied to restricted areas distributed over the surface of the mat in a manner similar to spot welding. This is shown in Fig. 4 by modifying the design of the roll 20 as shown at 29 in Fig. 3.

It has also been found advantageous in obtaining the desired characteristics of the finished product to use a mixture of more than one of the known vinyl resins. As an example of this, to an approximately saturated solution of "Lucite" in toluene may be added a solution of "Polystyrene" in xylol, the proportion being such as to give a final product containing 90% of "Lucite" and 10% of "Polystyrene" after the solvent has been removed.

While I have shown and described specific embodiments of my invention, modifications thereof will be apparent to those skilled in the art. Therefore it is intended to cover by the appended claims not only the specific embodiments shown and described but also such modifications thereof or related embodiments as come within the true spirit and scope of my invention.

I claim:

1. For use in the powerful oxidizing environment prevailing at the surface of the plates of a storage battery, a retainer comprising: a net or mesh of attenuated, homogenous filaments of vinyl resin of substantial length consolidated together at points spaced throughout the net or mesh to form integral masses of vinyl resin connected by vinyl resin filaments, the flexibility of which oppose breakage when the retainer is assembled or otherwise handled.

2. A storage battery retainer consisting of, a single layer mat of fine, heterogeneously disposed filaments of vinyl resin substantial length, the contiguous filaments integrally united with each other at their points of contact and having flexible filaments of substantial length between the points of attachment, thereby providing a unitary, self-sustaining, porous retainer capable of manual handling and assembly.

3. A storage battery retainer consisting of, a net or mesh of homogeneous filaments of vinyl resin of substantial length intergal at their branches or junctions and integral at the edges of the retainer and having between the branches or junctions flexible filaments which oppose breakage at the junctions or branches and adapt the retainer for assembly without breakage.

4. A storage battery retainer consisting of, a single layer mat of fine, heterogeneously disposed attenuated filaments of vinyl resin of substantial length, the filaments integrally merged with one another at spaced intervals and having between the merged portions flexible filaments which oppose breakage of the merged portions when the retainer is assembled or otherwise handled.

5. A storage battery retainer comprising a single layer mat of attenuated, heterogeneously disposed, solid threads of vinyl resin of substantial length having contiguous threads consolidated into masses of vinyl resin at spaced intervals over the surface of the mat and consolidated together along the entire peripheral edges of the mat, thereby providing a unitary, self-sustaining, porous retainer capable of manual handling and assembly.

CLARENCE A. HALL.